(No Model.) 2 Sheets—Sheet 1.

J. COLE.
PHOTOGRAPHIC CAMERA.

No. 561,966. Patented June 16, 1896.

Witnesses:
H. K. Boulter
C. G. Turnbull

Inventor
James Cole
By Wm. E. Poulter
Attorney (No Model.) 2 Sheets—Sheet 2.

J. COLE.
PHOTOGRAPHIC CAMERA.

No. 561,966. Patented June 16, 1896.

Witnesses:
H. K. Boulter
C. Thorburn

Inventor,
James Cole
By Wm E. Boulter, attorney

UNITED STATES PATENT OFFICE.

JAMES COLE, OF LONDON, ENGLAND.

PHOTOGRAPHIC CAMERA.

SPECIFICATION forming part of Letters Patent No. 561,966, dated June 16, 1896.

Application filed August 19, 1895. Serial No. 559,746. (No model.)

*To all whom it may concern:*

Be it known that I, JAMES COLE, a subject of the Queen of England, residing at Whetstone, London, county of Middlesex, England, have invented certain new and useful Improvements in Photographic Cameras and the Like, of which the following is a specification.

This invention for improvements in photographic cameras and the like has for its object to provide the camera with a rising-and-falling front of such construction that the lens or lenses can be placed, while focusing, opposite the extreme top or bottom edge or part of the sensitized plate or surface and enable the principal or selected object in the photograph to be produced on any desired part of the sensitized surface and the greatest possible advantage secured in photographing high buildings or objects.

The invention consists in forming the lens-front wholly or partly of flexible material, so as to admit of its upper and lower portions being deflected from the plane of the central portion over and under the camera-body when it is adjusted vertically.

The invention will be best understood by reference to the accompanying drawings, in which—

Figure 1:
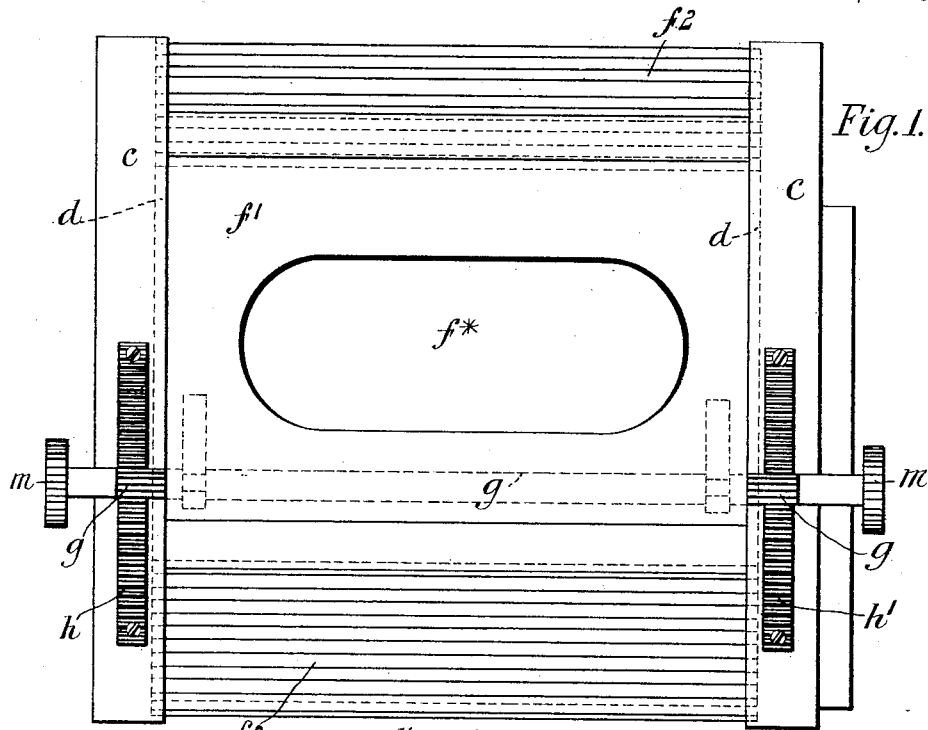
Figure 2:
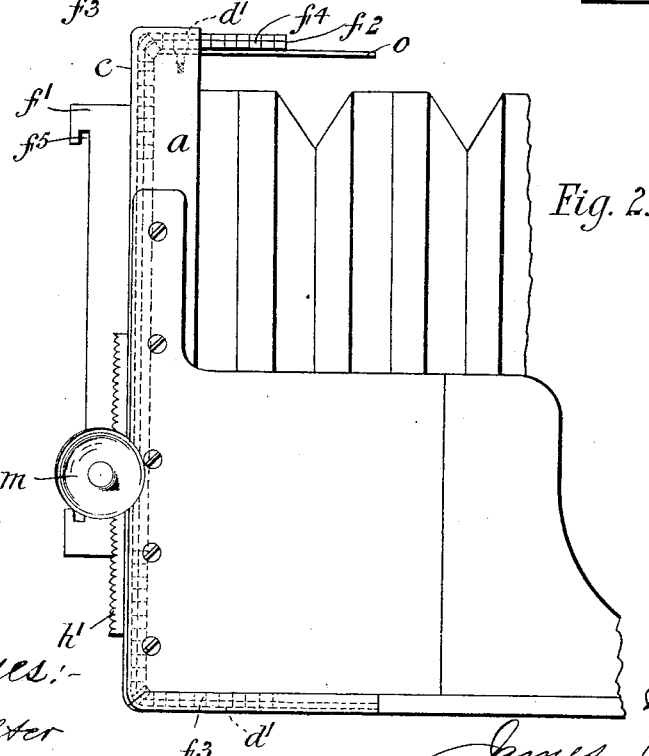
Figure 4:
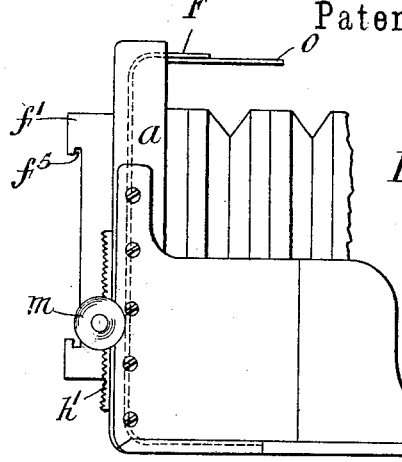
Figure 3:
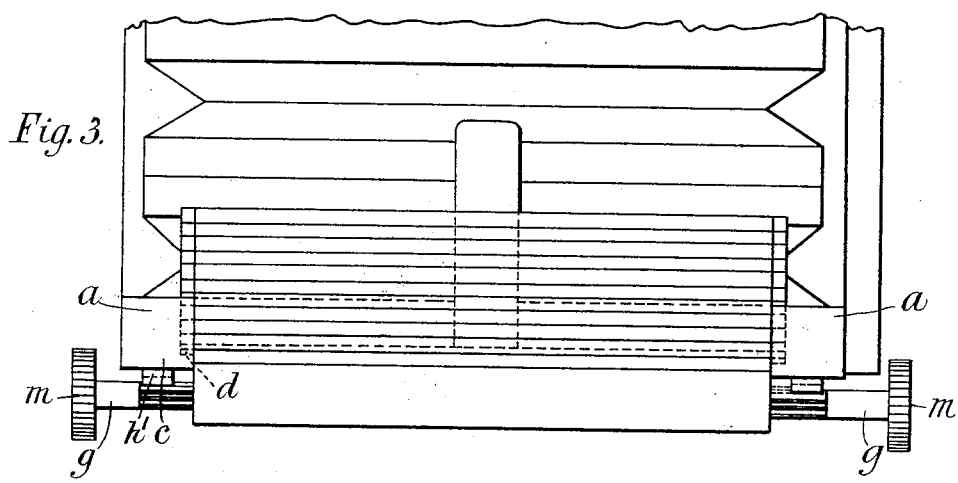
Figure 7:
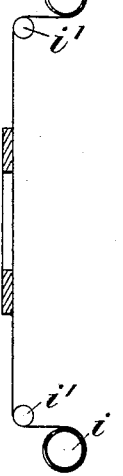
Figure 5:
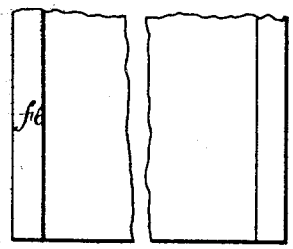
Figure 6:
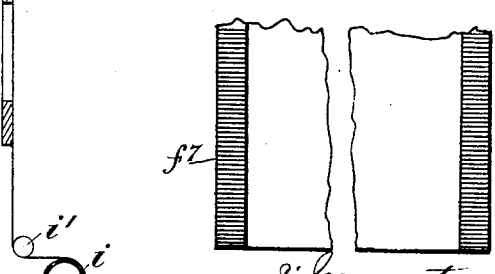

Figure 1 is a front elevation, Fig. 2 a side elevation, and Fig. 3 a plan, of a camera fitted with one form of lens-front constructed according to this invention, the front being shown extended partly over the top and partly under the bottom of the camera-body, which latter in Figs. 2 and 3 is shown partly broken away. Fig. 4 is a side elevation of a camera fitted with an alternative form of lens-front. Figs. 5 and 6 are views of portions of modified constructions of the flexible front, and Fig. 7 is a diagrammatic view showing a modified arrangement of the adjusting mechanism. Figs. 4, 5, and 6 are drawn to a smaller scale than that to which Figs. 1, 2, and 3 are drawn.

Like letters indicate like parts throughout the drawings.

$a$ represents the front of the camera-body, provided with a large central opening. On either side of this front is a vertical guide $c$, having a groove $d$ for the rising-and-falling front to work in, the guides extending horizontally a short distance, as at $d'$, on the upper and under sides of the camera-body in order that the flexible portions of the front may conform to the shape of the camera-body and not, as in existing arrangements, wherein a rigid rising-and-falling front is used, project vertically above or below it, to be inconvenient or liable to damage.

The rising-and-falling front represented in Figs. 1, 2, and 3 consists of a central board $f'$, herein termed the "lens-board," and which is here shown with a central opening $f^\times$ and grooves $f^5$, the latter to receive a cross-front, to which the lens is attached. The lens-board $f'$ is preferably just wide enough to take the lens (or lenses, if a stereoscopic camera is used) or cross-front, and attached to its upper and lower edges are the top and bottom extensions $f^2 f^3$, respectively, each consisting preferably, of a series of horizontal slats or strips firmly attached to a flexible backing, which may be of cloth, leather, or other suitable opaque material. This front $f' f^2 f^3$, which is formed chiefly of wood or other suitable material, is chamfered or rabbeted at either side, as at $f^4$, in order that it may engage with and be guided in the corresponding grooves $d$ on the camera-front.

Pivoted to the lens-board $f'$ is a toothed pinion $g$, which may be of pinion-wire, the teeth of which engage with the racks $h\ h'$, secured either directly to the front of the camera-body or, as shown, through the guides $c$, so that by turning the pinion $g$ by means of the milled heads $m$ the lens-board $f'$ is caused to rise or fall and with it the attached flexible extensions $f^2 f^3$.

By the flexible parts $f^2 f^3$ extending over the top and bottom of the camera in the manner described it is possible to raise or lower the lens to its extreme limit without producing any vertically-projecting part above or below the camera or admitting light either under or over the front $f'$.

A metal strip $o$ may be attached to the top of the camera to support and assist the flexible portion $f^2$ in its movements.

I do not wish to confine myself to the use of continuous horizontal slats or strips attached to a flexible backing, as shown in Figs. 1, 2, and 3, as in some cases, as shown, for example, in Fig. 4, I may form the whole lens-front F of sheet metal, celluloid, or other suitable material possessing the necessary flexible and opaque qualities; or, as shown in Fig. 5, I may form the lens-front of cloth or other opaque fabric provided at each of its side edges with a stiffening-strip $f^6$ of material which may be less flexible than the other or central portion of the lens-front, or with a strip $f^7$, formed of short slats, each such strip engaging in one of the before-mentioned grooves $d$ of the camera-front; or, as shown in Fig. 7, I may provide rollers $i$, onto one or the other of which the flexible extensions $f^2 f^3$ may be wound, according to whether it is desired to raise or lower the lens, other rollers $i'$ being provided for guiding the extensions and insuring the necessary light-tight joint being made therewith. When it it is desired to lower the lens, the lower of the rollers $i$ may be rotated, and vice versa, suitable means, such as milled heads, being provided for enabling the rollers $i$ to be readily rotated.

If desired, the lens may be mounted directly on the lens-board $f'$ instead of, as before described, on the cross-front.

In a camera constructed as before described the lens is capable of being adjusted to any desired part of the camera-front or sensitized surface, so that for photographing, say, a high building the camera itself need not be tilted, and therefore a swing-back which has hitherto been necessary for correcting the focal error introduced by such tilting is now rendered unnecessary, the parallelism of the lens and sensitized surface always remaining undisturbed.

I claim—

1. In a photographic camera, the combination with the camera-body of a vertically-arranged guide at each side of the same, provided at the top and bottom of the camera-body with horizontal extensions, a flexible plate adapted to travel in the vertical guides and in the horizontal extensions thereof, and a guide and supporting strip attached to the top of the camera-body adapted to support and assist the flexible plate in moving through the upper horizontal extensions of the guides, as specified.

2. In a photographic camera, the combination with the camera-body of a vertically-arranged guide at each side of the same, provided at the top and bottom of the camera-body with horizontal extensions, and a flexible plate comprising end portions adapted to be guided in the extensions of the vertical guides, and an intermediate portion provided with a central opening and grooves adapted to receive a cross-front, as described.

3. In a photographic camera, the combination with the camera-body of a flexible plate adapted to move relatively to the said body as described, racks secured to the camera-body at opposite sides of the flexible plate, pinions rotatably mounted on the plate at opposite sides, and engaging with the racks, and operating-heads for effecting the rotation of the pinions, as described for the purpose set forth.

In testimony whereof I have hereto set my hand in the presence of the two subscribing witnesses.

JAMES COLE.

Witnesses:
ALFRED J. BOULT,
HARRY B. BRIDGES.